United States Patent
Stoller et al.

(10) Patent No.: US 9,008,969 B2
(45) Date of Patent: Apr. 14, 2015

(54) PULSED X-RAY SIGNAL PROCESSING

(75) Inventors: Christian Stoller, Princeton Junction, NJ (US); Olivier G. Philip, Ewing, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 32 days.

(21) Appl. No.: 11/953,113

(22) Filed: Dec. 10, 2007

(65) Prior Publication Data

US 2009/0150077 A1 Jun. 11, 2009

(51) Int. Cl.
*G01V 5/12* (2006.01)

(52) U.S. Cl.
CPC .......................... *G01V 5/12* (2013.01)

(58) Field of Classification Search
USPC ........................................ 702/6, 8, 9
See application file for complete search history.

(56) References Cited

U.S. PATENT DOCUMENTS

| | | | |
|---|---|---|---|
| 4,129,777 A * | 12/1978 | Wahl et al. ............. | 250/264 |
| 4,717,825 A * | 1/1988 | Smith et al. ............ | 250/256 |
| 4,749,859 A * | 6/1988 | Schmidt ................. | 250/269.8 |
| 4,926,044 A | 5/1990 | Wraight | |
| 5,067,090 A * | 11/1991 | Seeman ................... | 702/8 |
| 5,349,195 A | 9/1994 | Dumont | |
| 5,434,408 A | 7/1995 | Smith, Jr. et al. | |
| 5,523,939 A | 6/1996 | Stephenson | |
| 5,680,431 A | 10/1997 | Pietras, III et al. | |
| 5,841,135 A * | 11/1998 | Stoller et al. ........... | 250/269.3 |
| 5,884,234 A | 3/1999 | Jorion et al. | |
| 5,910,654 A | 6/1999 | Becker et al. | |
| 6,738,720 B2 * | 5/2004 | Odom et al. ............ | 702/78 |
| 7,073,378 B2 | 7/2006 | Smits et al. | |
| 7,075,062 B2 | 7/2006 | Chen et al. | |
| 7,148,471 B2 | 12/2006 | Roscoe et al. | |
| 8,050,866 B2 * | 11/2011 | Jacobson ............... | 702/8 |
| 2002/0009177 A1 * | 1/2002 | Takahashi .............. | 378/49 |
| 2003/0106993 A1 | 6/2003 | Chen et al. | |
| 2005/0028586 A1 | 2/2005 | Smits et al. | |
| 2006/0033022 A1 | 2/2006 | Madigan et al. | |
| 2006/0192095 A1 | 8/2006 | Stoller et al. | |
| 2006/0192096 A1 | 8/2006 | Radtke et al. | |
| 2006/0208184 A1 * | 9/2006 | Guo ........................ | 250/253 |
| 2007/0144739 A1 | 6/2007 | Fitzgerald | |

FOREIGN PATENT DOCUMENTS

| | | |
|---|---|---|
| EP | 0134626 | 3/1985 |
| EP | 0396464 | 11/1990 |

* cited by examiner

*Primary Examiner* — Mohamed Charioui
(74) *Attorney, Agent, or Firm* — Cathy Hewitt

(57) ABSTRACT

Method and system for analyzing electrical pulses contained in a pulse train signal representative of the interaction of x-ray bursts with a nuclear detector configured for subsurface disposal. The pulse train signal is sampled to form a digitized signal. The total energy deposited at the detector during an x-ray burst is determined from the digitized signal, and a count rate of x-ray pulses from the burst is determined. A subsurface parameter is determined using the total energy deposit.

26 Claims, 6 Drawing Sheets

PULSED X-RAY SIGNAL PROCESSING

BACKGROUND

1. Technical Field

This invention relates generally to techniques for processing pulse signals and in particular to the analysis and discrimination of pulse signals in a nuclear spectroscopy system, such as those generated by a scintillation detector/photomultiplier.

2. Description of Related Art

The characteristics of geological formations are of significant interest in the exploration for, production and monitoring of subsurface water and mineral deposits, such as oil and gas. A variety of techniques have been developed to measure subsurface characteristics and evaluate the obtained data to determine the petrophysical properties of interest. These techniques typically employ the subsurface deployment of tools equipped with sources adapted to emit energy into the formations (typically through a borehole traversing the formations). The emitted energy interacts with the surrounding formations to produce signals that are detected and measured by one or more sensors or detectors on the tool. By processing the detected signal data, a profile or log of the subsurface parameters is obtained.

Of the many well logging instruments and techniques developed over the years to determine the hydrocarbon content and productivity of earth formations, the spectroscopy tool, by which energy spectra of the constituents of formation matrices and fluids are generated, has been found to provide information of particular value in formation analysis. In nuclear spectroscopy applications, the energy of incident nuclear particles is measured. In many cases this measurement is accomplished by measuring the energy deposited by the particle in a nuclear detector.

Parameters of subsurface formations which may be determined as a result of nuclear phenomena measurements include formation density, fractional volume of void or pore space in the formation (porosity), carbon/oxygen (C/O) ratios, formation lithology, and neutron capture cross section (Sigma), among other measurements. Parameters which may be determined by spectral analysis of the gamma-rays include concentration of various chemical elements, for example. Properties of fluids in the wellbore may also be determined from various gamma-ray measurements.

Gamma-ray scattering has been used for the determination of subsurface parameters in well logging for many years. Until recently, almost all of these measurements relied on the use of chemical sources of gamma-rays (mainly $^{137}$CS) or X-ray tubes operating continuously. Gamma-ray sources pose a significant radiation hazard for handling and storage. In addition, these sources are under scrutiny as they could potentially be used in the manufacture of a dirty bomb.

Processing of signals from nuclear sensors has a long history and many approaches are well documented in the open literature (See e.g., the book by GLENN KNOLL, RADIATION DETECTION AND MEASUREMENT ($3^{rd}$ ed., John Wiley 1999)). Most data acquisition in low energy nuclear physics deals with continuous radiation at count rates, which make it possible to distinguish and analyze the signals from single gamma-rays with a detector.

In the early 1980s tests were performed with a downhole linear accelerator. This device was capable of producing a large flux of high energy x-rays. However, the production occurred in very short bursts of very high intensity. Experiments have been conducted with other downhole pulsed x-ray devices. In most cases, it has not been possible to measure single x-ray events and to perform x-ray spectroscopy. In these cases the traditional pulse processing schemes do not work, since multiple x-rays become convolved in a single electronic pulse. This reduces or eliminates spectroscopy information contained in the signal.

FIG. 1 shows a comparison of the time sequence of x-ray signals as seen at the output of a detector with a continuous source of x-rays and with a pulsed source of low duty cycle. The top left of the figure shows the sequence of pulses arriving randomly in the detector at an average of about 14,000 counts/second. The top right shows the time sequence if the average count rate is increased by a factor 10. The bottom reflects the same total x-ray flux in the same detector using a pulsed source with a duty cycle of 0.2%, i.e., the source emits x-rays during 1 μs out of 500 μs. The vertical scales differ by a factor 10 between the top and the bottom graphs. The signal at the output represents the total of the pulses in a 1 μs interval equivalent to the integral of the pulses in a 500 μs interval with a continuous source of the same average output.

At very high instantaneous count rates the scattered gamma-rays or x-rays arrive at the detector quasi-simultaneously. The information from the pulses is summed and there is no spectroscopy information left from indistinguishable single pulses. The only information left is the sum total of all the pulse heights registered during the interval of the x-ray burst.

A need remains for improved techniques to process signals from nuclear sensors when pulsed source devices are used.

SUMMARY

One aspect of the invention provides a method for analyzing electrical pulses contained in a pulse train signal, the pulses being representative of the interaction of at least one x-ray or burst of x-rays with a nuclear detector configured for subsurface disposal. The method includes sampling the pulse train signal to form a digitized signal of the pulse train; determining the total energy deposited at the detector during a burst of the x-rays from the digitized signal; and determining a subsurface parameter from the determined total energy deposit.

Another aspect of the invention provides a system for analyzing electrical pulses contained in a pulse train signal. The system includes a nuclear detector configured for subsurface disposal and to produce a pulse train signal representative of the interaction of at least one x-ray or burst of x-rays with the detector; a processor configured to process instructions: to sample the pulse train signal to form a digitized signal of the pulse train; to determine the total energy deposited at the detector during a burst of the x-rays from the digitized signal; and to determine a subsurface parameter from the determined total energy deposit.

Another aspect of the invention provides software for analyzing electrical pulses contained in a pulse train signal. The software embodied in computer readable media and when executed operable to: sample a pulse train signal representative of the interaction of at least one x-ray or burst of x-rays with a nuclear detector configured for subsurface disposal; form a digitized signal of the pulse train; determine the total energy deposited at the detector during a burst of the x-rays from the digitized signal; and determine a subsurface parameter from the determined total energy deposit.

BRIEF DESCRIPTION OF THE DRAWINGS

Other aspects and advantages of the invention will become apparent upon reading the following detailed description and upon reference to the drawings in which like elements have been given like numerals and wherein.

DETAILED DESCRIPTION

Figure 1:
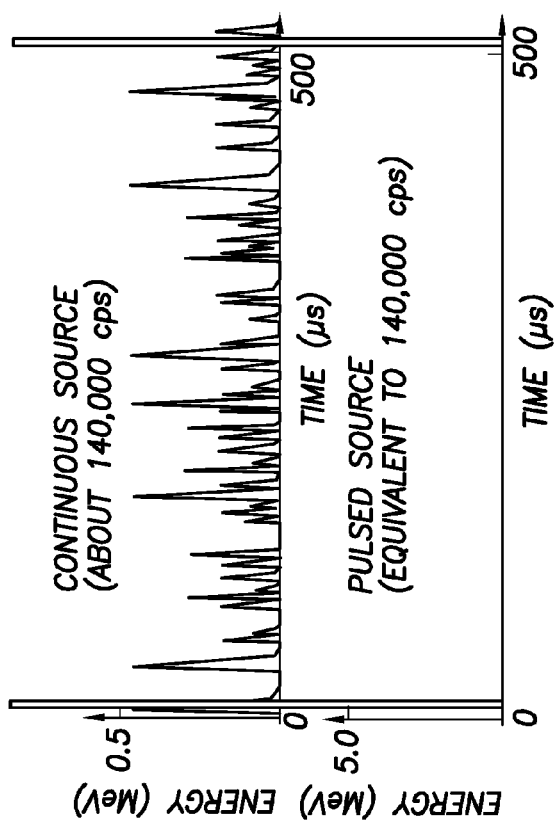
FIG. 1 shows plots of nuclear radiation pulse output from a nuclear detector.
Figure 1:
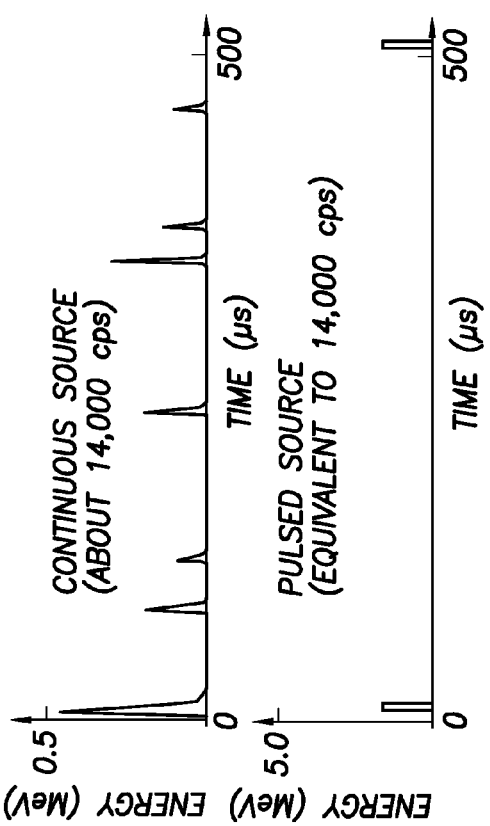
Figure 2:
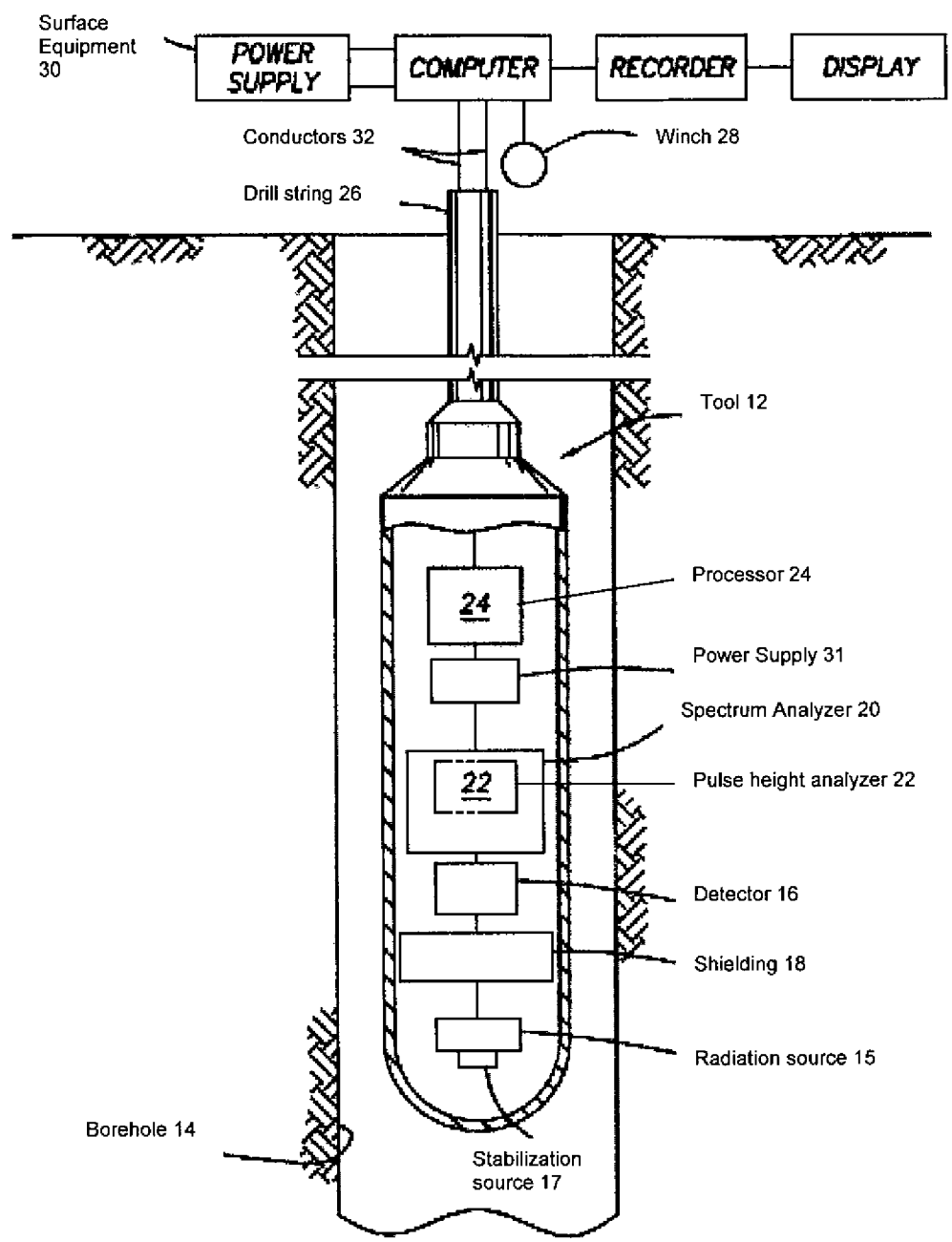
FIG. 2 is a schematic of a system incorporating a downhole tool according to aspects of the invention.

FIG. 2 shows a downhole tool 12 disposed in a borehole 14 that penetrates a subsurface formation. The tool 12 might be, for example, of the type described in U.S. Pat. Nos. 7,073, 378, 5,884,234, 5,067,090 and 5,349,195 (all assigned to the present assignee and entirely incorporated herein by reference). The tool 12 includes a pulsed radiation source 15 which emits successive pulses or bursts of x-rays into the formations surrounding the borehole 14. U.S. Pat. Nos. 7,073,378 and 5,680,431 describe pulsed x-ray sources for subsurface use (both assigned to the present assignee and entirely incorporated herein by reference). Radiation resulting from interactions between the x-rays and the formation is detected by a nuclear detector 16. The detector 16 includes a scintillation crystal optically coupled to a photomultiplier tube which, in response to a detected gamma ray, generates a pulse signal whose amplitude is representative of the energy of the gamma ray deposited in the scintillation crystal. Appropriate shielding 18 is interposed between the detector 16 and the radiation source 15 to reduce the undesired flux of radiation. X-rays and gamma-rays are indistinguishable if they have the same energy. Thus for purposes of this disclosure, the term "x-ray" is understood to comprise x-rays or gamma-rays, and vice-versa.

Output pulses from the detector 16 are passed by a spectrum analyzer 20 including filtering circuits, a pulse height analyzer 22, and other electronics/circuitry further described below. Output from the spectrum analyzer 20 is fed to a processor 24. The tool 12 is shown supported in the borehole 14 by a logging cable 26 in the case of a wireline system or a drill string 26 in the case of a while-drilling system. With a wireline tool, the tool 12 is raised and lowered in the borehole 14 by a winch 28, which is controlled by the surface equipment 30. Logging cable or drill string (in the case of a drill string conveyed wireline tool) 26 includes conductors 32 that connect the downhole electronics and radiation source 15 with the surface equipment 30 for signal/data/power and control communication. Alternatively, the signals/data may be processed and/or recorded in the tool 12 and the processed data transmitted to the surface equipment 30. In logging-while-drilling applications, processing will be done downhole and tool power will be supplied by a downhole power supply built into the tool or part of a separate asset in the tool assembly. Communication to the surface can be done with any of the communication means used in while drilling applications (e.g. mud pulse, electromagnetic, wired drilled pipe, etc.). Aspects of the tool 12 may also be implemented with a separate power supply 31 for the radiation source 15.

The present invention discloses a mostly digital signal processing scheme to address the data acquisition requirements in the presence of pulsed x-ray sources. In aspects of the invention a signal processing scheme samples a pulse train at a high frequency. The digital processing handles integration, stabilization and adjustments for temperature or sensor-related changes in pulse shape. Aspects of the invention may be implemented using analog and digital circuits as are commercially available or using special integrated circuits. The samples of the pulse train are processed digitally to obtain the sum total of the energy deposited in a sensor from multiple gamma rays arriving in a very short interval during a burst and also a gain stabilization signal, typically obtained from a small radioactive source 17, as shown in FIG. 2. Traditionally, the stabilization signal for the gain stabilization of downhole nuclear tools has been a gamma-ray source ($^{137}$Cs). The radioactive source 17 may comprise any suitable source as known in the art.

Figure 3:
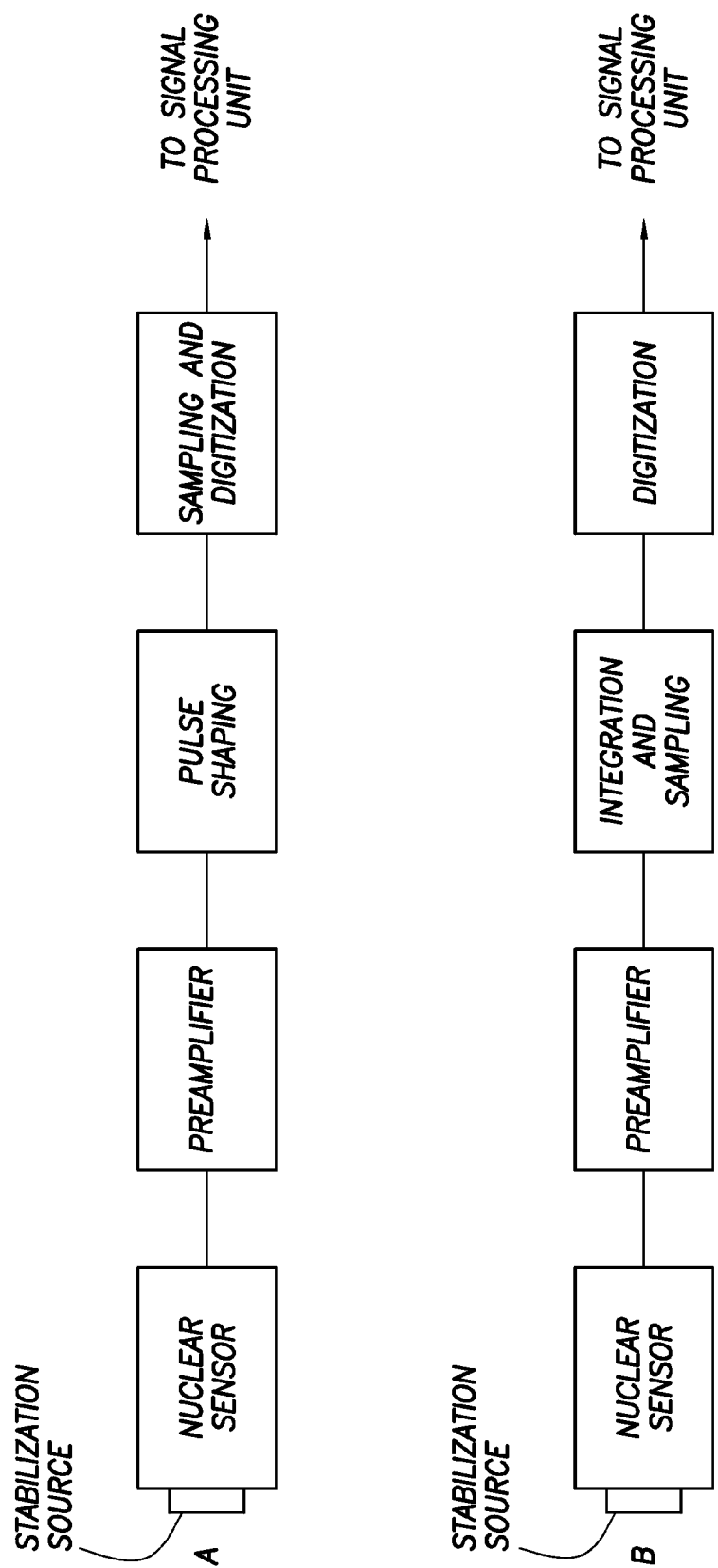
FIG. 3 shows schematic block diagrams of signal processing electronics according to aspects of the invention.

An aspect of the invention entails measurement of total energy. The total energy measurement consists of measuring the total energy deposited in the detector 16 during a single x-ray burst with a very high accuracy. FIG. 3 shows two electronic front ends A, B of aspects of the invention. These aspects A, B may be implemented within the spectrum analyzer 20.

Figure 4:
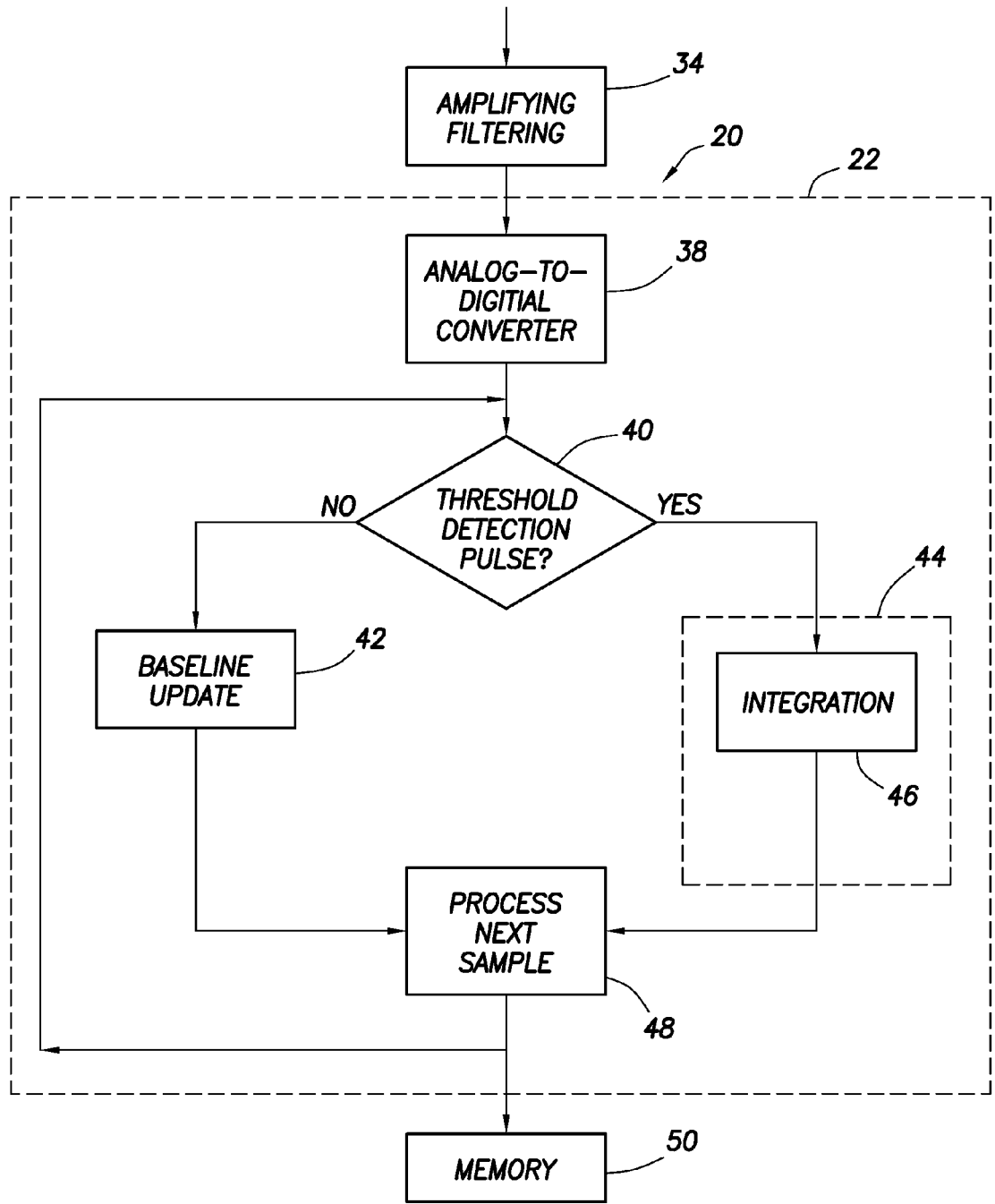
FIG. 4 is a schematic block diagram of a spectrum analyzer according to aspects of the invention.

Aspect A performs an analog integration before sampling and analog-to-digital conversion as described in U.S. Pat. No. 5,067,090 (assigned to the present assignee and entirely incorporated herein by reference). FIG. 4 shows a diagram of an aspect of the spectrum analyzer 20 including amplifying-filtering circuitry 34, receiving analog signals from the detector 15 photomultiplier, and followed by the pulse height analyzer 22. Amplifying-filtering circuits are well known in the art and mainly comprise amplifiers and filters. Filtering allows one to shape the train of pulses in a predetermined fashion so that the pulses can be easily further processed. Filters may be, for example, of the differential integrator type (CR–RC), and more specifically of CR–(RC)" type, realizing a Gaussian curve. More details about such filters can be found in the book by GLENN KNOLL, RADIATION DETECTION AND MEASUREMENT ($3^{rd}$ ed., John Wiley 1999).

The pulse height analyzer 22 comprises an analog-to-digital converter 38, which receives the analog signal issued from amplifying-filtering circuits 34 and converts the signal to digital samples at a given rate. The ADC is preferably a flash ADC. The pulses exhibit an essentially constant signal corresponding to the noise or background level, i.e., when no pulses are delivered by the photomultiplier. This constant signal is known as the baseline B by those skilled in the art. For each instantaneous sample S, the difference between the samples and the baseline B is compared to a threshold value T, arbitrarily chosen, via a threshold detector 40. This step allows detection of an incoming pulse each time an incoming sample S of a pulse exceeds the baseline B by the threshold value T. Alternatively, since the timing of the x-ray pulse is known, the detection can be based on a predetermined time interval.

In case the difference (S–B), i.e., sample minus baseline, is below threshold T, the sample is not representative of a pulse, but of the baseline B. The sample value S is used for updating the baseline value B, via a baseline update unit 42, connected to the "NO pulse" output of the threshold detector 40. Any difference value (S–B) above the threshold T implies the instant sample S is representative of a pulse, and is thus directed from threshold detector 40 to a pulse processing unit 44. In most cases, the successive incoming samples, which are representative of a pulse, are directed to an integration unit 46, which stores and processes the samples so as to calculate the energy of the pulse. The output of pulse processing unit 44 and the output of the baseline update unit 42, are connected to a process next sample unit 48. The output of the process next sample unit 48 is fed to memory 50 and to the threshold detector 40. Further details regarding the analog integration, sampling, and analog-to-digital conversion for this aspect of the invention are described in U.S. Pat. No. 5,067,090.

Aspect B of the invention entails a processing method as described in U.S. Pat. No. 5,349,195 (assigned to the present assignee and entirely incorporated herein by reference), which uses a sampling integrator and integrates the pulse train during each sampling interval, then samples and digitizes it before the digital signal processing. During an initial processing stage, the electrical signal from the photomultiplier in the form of analog pulses corresponding to the nature of the detected radiation is digitized and optionally shaped so that the energy of each pulse lies within a time slot of fixed duration. This stage comprises the processing steps of sampling the analog signal and integrating the signal over a selected sampling period by means of conventional analog integrating sampler circuitry. An analog circuit is used for performing the sampling and integrating steps, and for performing analog-to-digital conversion. Digital circuits are used for performing a filtering step and a pulse detection step. Further details regarding the processing scheme for this aspect of the invention are described in U.S. Pat. No. 5,349,195. The configurations of aspects A and B provide a digitized pulse train signal for additional processing.

Figure 5:
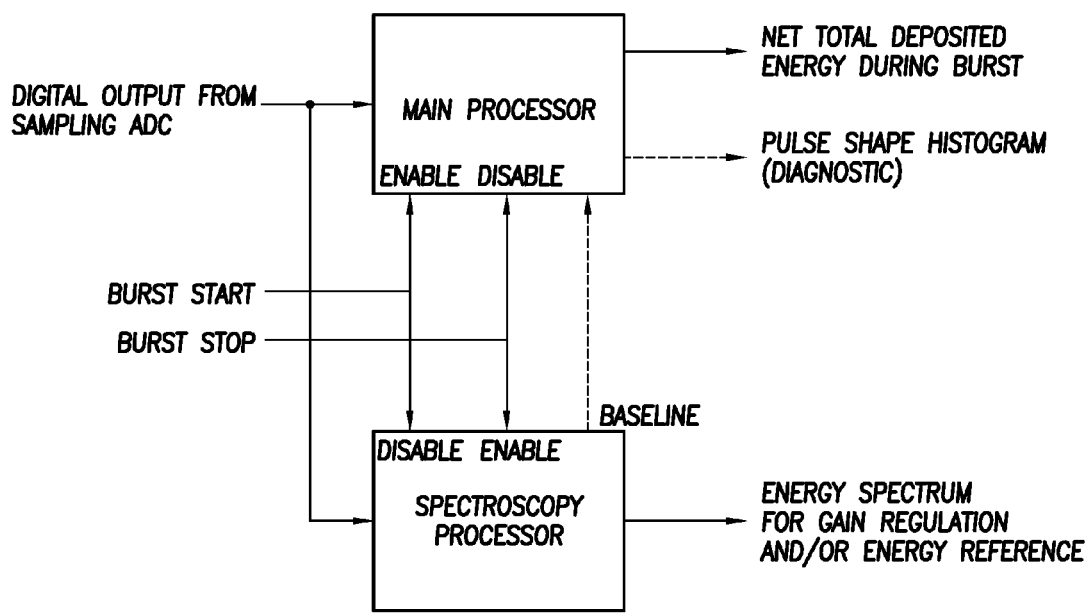
FIG. 5 is a schematic block diagram of signal processing electronics according to aspects of the invention.

FIG. 5 shows additional aspects of the digital signal processing techniques of the invention. Functionally, multiple acquisition/processing paths are possible. One path (main processing) integrates the total energy deposit during the burst from the source 15. The contribution (offset) due to the presence of the stabilization source 17 and due to DC offsets of the baseline needs to be subtracted. The baseline tracking can either be done internally to the main unit or it can be supplied by the baseline processing of an ancillary spectroscopy unit.

A second processing path may contain the ancillary spectroscopy unit. This unit may utilize the approaches disclosed in the previously mentioned patents (U.S. Pat. Nos. 5,349,195, 5,067,090) and in 5,884,234, also assigned to the present assignee and entirely incorporated herein by reference. The processor supplies the spectral output from the acquisition of the stabilization source spectrum in the intervals between subsequent bursts. Spectroscopy processing includes determination and subtraction of the baseline and, if necessary, compensation for the change of the pulse shape with temperature and time and differences in pulse shape between different tools and electronic components.

The output of the spectroscopy channel is used to supply a continuous gain reference for the integral acquired in the main processing unit. This gain reference can be used to adjust the total system gain or as a gain reference for the acquired integral, which can be used in post processing. The use of active gain regulation combined with the use of a gain reference may be necessary to obtain the required accuracy of the output from the main processing unit. While the two processing paths are shown as separate units, they may be contained in a single processor (e.g., field-programmable gate array) or in a DSP sufficiently fast for high sampling rates.

In some aspects of the invention, a short pause is allowed after the burst before enabling the spectroscopy processing. The spectroscopy processing may not cover the interval before the next pulse completely, in particular, if the system gain changes after the pulse. An aspect of the invention splits the time between bursts into multiple time gates to obtain an estimate of time dependent gain changes, and thus to estimate the proper gain calibration during the burst.

Figure 7:
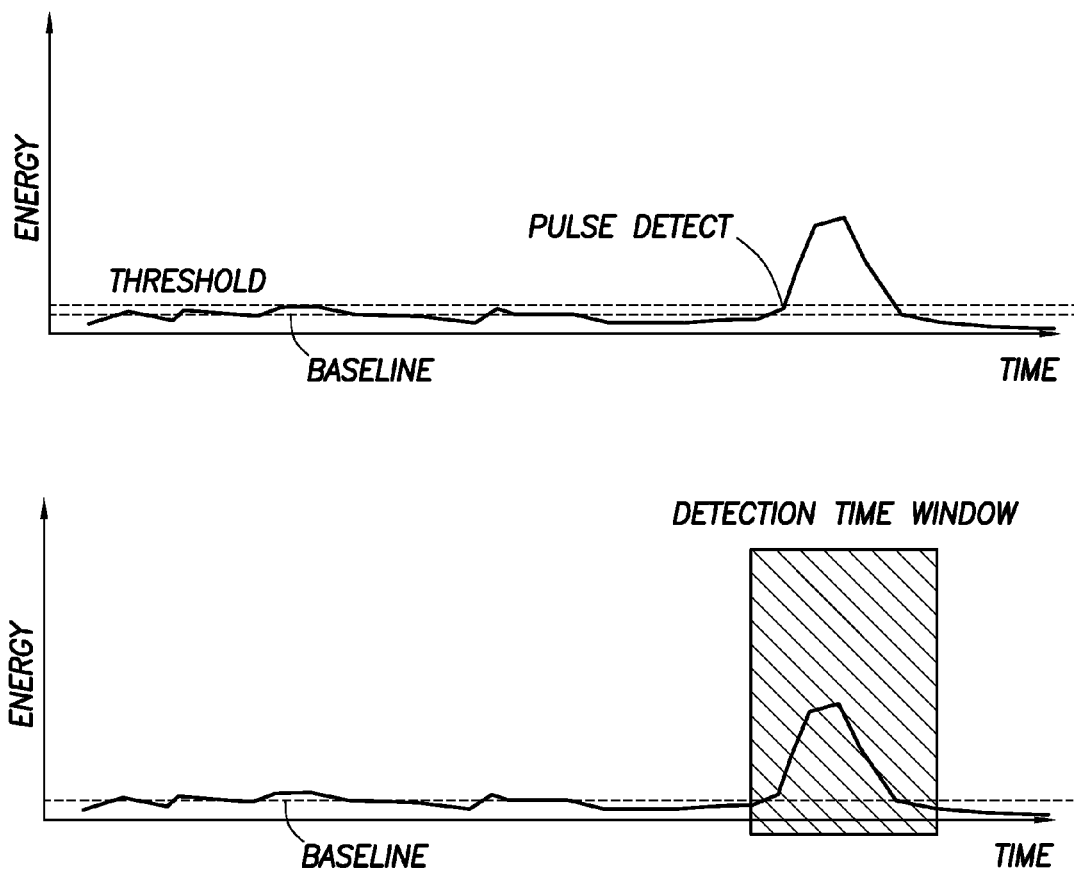
FIG. 7 shows a time gated pulse train signal from a nuclear detector according to aspects of the invention.

In some aspects of the invention, the threshold detector 40 of FIG. 4 can be replaced by enabling the pulse detection during a predetermined time bin with respect to the generation of the x-ray burst by synchronizing the processing with the known x-ray pulse sequence as indicated in FIG. 7. The threshold detection approach can be used concurrently to detect the asynchronous signals from noise, gamma-ray background and the gain stabilization source.

Figure 6:
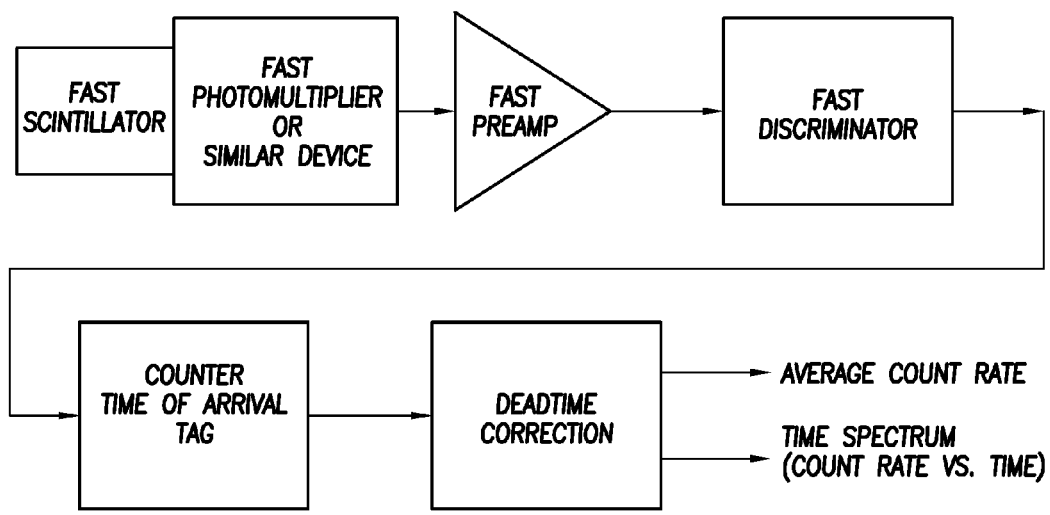
FIG. 6 is another schematic block diagram of signal processing electronics according to aspects of the invention.

An aspect of the invention entails measurement of the total count rate and total energy. Conventional high-speed scintillators, fast PMTs, and fast electronics providing fast channels are combined to count separate pulses during the burst. Count rates during the burst could be approaching 50 to 100 MHz. Aspects of this approach are shown in FIG. 6. With a fast photomultiplier the rise-time of the photon output from the scintillator is very rapid, allowing for pulse discrimination. There will still be pulses which are too close together to be separated. In some aspects, the resulting count rate loss can be corrected by applying a dead time correction. The correction may be applied as a function of the instantaneous count rate. Therefore, the circuitry registers the number of counts as a function of the arrival time bin. The resulting time distribution of the count rate is used for the correction. Alternatively, another aspect entails derivation of an approximate count rate distribution from the sampled pulse height during the burst. If the pulse height is displayed as a function of time during the burst, one obtains an approximate count rate distribution, and thus another means of correcting for dead time.

The count rate/burst measurement allows for determination of the average energy/pulse. This average energy should depend on count rate (formation density), PEF and also tool standoff. The energy of the pulses can be determined by dividing the pulse height spectrum in at least two energy windows, which can be contiguous, overlapping or separate. A PEF estimate may be obtained from the average energy/pulse, as well as estimates of other subsurface parameters as known in the art.

Figure 8:
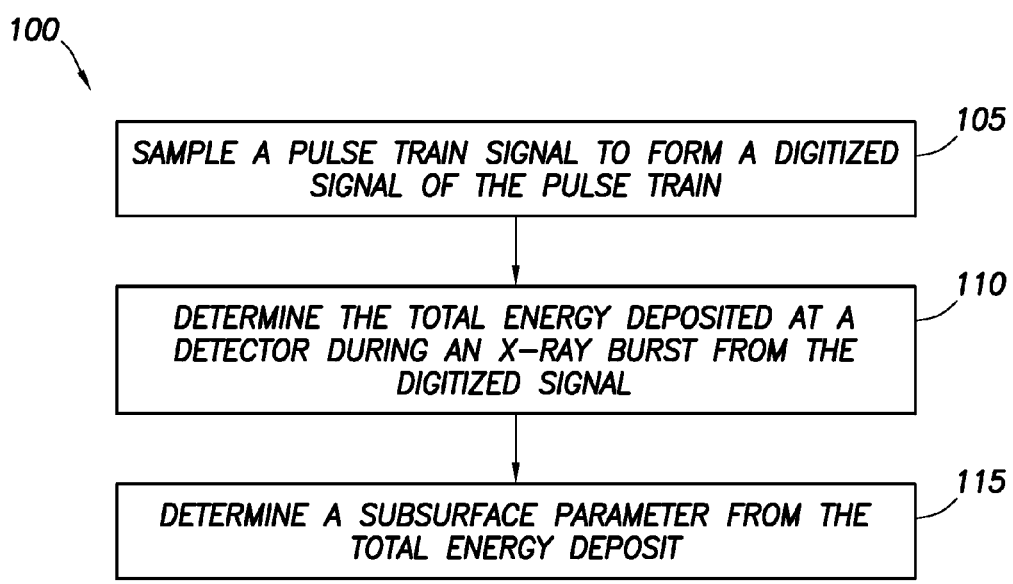
FIG. 8 shows a flow chart of a method for analyzing electrical pulses contained in a pulse train signal according to aspects of the invention.

FIG. 8 shows a flow chart of a method 100 according to the invention for analyzing electrical pulses contained in a pulse train signal, the pulses being representative of the interaction of at least one x-ray or burst of x-rays with a nuclear detector 16 configured for subsurface disposal. In one aspect, at step 105 a method entails sampling a pulse train signal to form a digitized signal of the pulse train. At step 110, the total energy deposited at the detector during a burst of the x-rays is determined from the digitized signal. At step 115, a subsurface parameter is determined from the total energy deposit. This method 100 may be implemented using any of the configurations and processing techniques disclosed herein.

It will be apparent to those skilled in the art that aspects of the invention may be implemented using general-purpose computers having appropriate hardware and programmed with software to perform the techniques disclosed herein. The programming may be accomplished through the use of one or more program storage devices readable by the computer processor(s) and encoding one or more software programs of instructions executable by the computer for performing the operations described herein. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the system tools, in allocation remote from the well site (not shown), or shared by these means as known in the art. Aspects of the invention may also be implemented using conventional display means situated as desired to display processed or raw data/images as known in the art.

While the present disclosure describes specific aspects of the invention, numerous modifications and variations will become apparent to those skilled in the art after studying the disclosure, including use of equivalent functional and/or structural substitutes for elements described herein. For example, it will be appreciated that the disclosed instrument configurations can be implemented with various additional types of sources and sensors to perform a variety of subsurface measurements (besides nuclear-type measurements). It will also be appreciated that the disclosed aspects can be implemented with conventional electronics, sources, sensors, hardware, circuitry, housings and materials as known in the art. Systems implemented with the disclosed configurations for use in wireline, slickline, production logging, LWD/MWD, LWT, marine environments, and reservoir monitoring are all possible venues for applications of this invention. All such similar variations apparent to those skilled in the art are deemed to be within the scope of the invention as defined by the appended claims.

What is claimed is:

1. A method for analyzing electrical pulses contained in a pulse train signal, the pulses being representative of the interaction of a burst of x-rays with a nuclear detector configured for subsurface disposal, comprising:
    emitting x-rays generated by a pulsed x-ray source into an earth formation;
    detecting a burst of x-rays returning from the earth formation after the x-rays emitted into the earth formation interacted with the earth formation;
    sampling the pulse train signal to form a digitized signal of the pulse train;
    determining the total energy deposited at the detector during a burst of the x-rays from the digitized signal by integrating the digitized signal of the pulse train; and
    determining a subsurface parameter from the determined total energy deposited at the detector during the burst of x-rays.

2. The method of claim 1, further comprising counting with a fast channel individual pulse arrivals during the burst of x-rays, said counting occurring substantially simultaneously with determining the total energy deposited at the detector during the burst of x-rays.

3. The method of claim 2, wherein an energy of the pulses is determined by dividing a pulse height spectrum in at least two energy windows.

4. The method of claim 2, further comprising determining a count rate of x-ray pulses associated with the burst of x-rays and adjusting the count rate determination for pulses which are not distinguishable. pg,15

5. The method of claim 1, wherein the pulses are integrated before being sampled and digitized.

6. The method of claim 1, wherein determining the total energy deposited at the detector comprises determining a contribution to the pulse train not pertaining to the burst of x-rays, but arising from radioactivity during a quiescent period of time.

7. The method of claim 6, wherein determining a contribution to the pulse train not pertaining to the burst of x-rays comprises determining a gain stabilization signal.

8. The method of claim 1, wherein a pulse detection is performed by detecting a threshold crossing of a pulse sample.

9. The method of claim 1, wherein a pulse detection is based on a known timing of a burst of x-rays during a predetermined time interval.

10. The method of claim 1, wherein determining the subsurface parameter comprises determining an average energy per pulse associated with a burst of x-rays.

11. The method of claim 1, wherein the subsurface parameter comprises a density parameter. pg,16

12. A system for analyzing electrical pulses contained in a pulse train signal, comprising:
    a pulsed x-ray source to generate x-rays and to emit the x-rays into an earth formation;
    a nuclear detector configured for subsurface disposal and to detect a burst of x-rays returning from the earth formation after the x-rays emitted into the earth formation interacted with the earth formation, the nuclear detector to produce a pulse train signal representative of the interaction the burst of x-rays with the detector;
    a processor configured to process instructions:
    to sample the pulse train signal to form a digitized signal of the pulse train;
    to determine the total energy deposited at the detector during the burst of the x-rays from the digitized signal by integrating the digitized signal of the pulse train; and
    to determine a subsurface parameter from the determined total energy deposit.

13. The system of claim 12, wherein the processor is further adapted to execute instructions to count with a fast channel individual pulse arrivals during the burst of x-rays substantially simultaneously with determining the total energy deposited at the detector during the burst of x-rays.

14. The system of claim 13, wherein the processor is further adapted to execute instructions to divide a pulse height spectrum in at least two energy windows.

15. The system of claim 13, the processor is further adapted to execute instructions to determine a count rate of x-ray pulses associated with the burst of x-rays and to adjust the count rate determination for pulses which are not distinguishable. pg,17

16. The system of claim 12, the processor is further adapted to execute instructions to integrate the pulses before sampling and digitization.

17. The system of claim 12, wherein instructions to determining the total energy deposited at the detector comprise instructions to determine a contribution to the pulse train not pertaining to the burst of x-rays, but arising from radioactivity during a quiescent period of time.

18. The system of claim 17, wherein instructions to determine a contribution to the pulse train not pertaining to the burst of x-rays comprise instructions to determine a gain stabilization signal.

19. The system of claim 12, wherein a pulse detection is performed by detecting a threshold crossing of a pulse sample.

20. The system of claim 12, wherein a pulse detection is based on a known timing of a burst of x-rays during a predetermined time interval.

21. The system of claim 12, wherein instructions to determine the subsurface parameter comprise instructions to determine an average energy per pulse associated with a burst of x-rays.

22. The system of claim 12, wherein the subsurface parameter comprises a density parameter. pg,18

23. A non-transitory computer readable medium encoded with a computer software product for analyzing electrical pulses contained in a pulse train signal, the computer software product when executed by a computer being operable to:
sample a pulse train signal representative of the interaction of a burst of x-rays, resulting from the interactions between x-rays generated by a pulsed x-ray generator and emitted into an earth formation and the earth formation, said sample being obtained with a nuclear detector configured for subsurface disposal;
form a digitized signal of the pulse train;
determine the total energy deposited at the detector during a burst of the x-rays from the digitized signal by integrating the digitized signal of the pulse train; and
determine a subsurface parameter from the determined total energy deposit.

24. The non-transitory computer readable medium of claim 23, wherein the computer software product, when executed by a computer, is further operable to determine a count rate of x-ray pulses associated with the burst of x-rays and to adjust the count rate determination for pulses which are not distinguishable.

25. The non-transitory computer readable medium of claim 23, wherein the computer software product, when executed by a computer, is further operable for determining a subsurface parameter comprises determining an average energy per pulse associated with a burst of x-rays.

26. The non-transitory computer readable medium of claim 23, wherein the computer software product, when executed by a computer, is to determine the subsurface parameter as a density parameter.

\* \* \* \* \*